United States Patent [19]

Stephenson

[11] 4,389,059
[45] Jun. 21, 1983

[54] SEAT BELT WEBBING GUIDE

[75] Inventor: Robert L. Stephenson, Utica, Mich.

[73] Assignee: Allied Corporation, Morris Township, Morris County, N.J.

[21] Appl. No.: 205,225

[22] Filed: Nov. 10, 1980

[51] Int. Cl.³ .................. A44B 11/00; A62B 35/00; B60R 21/10
[52] U.S. Cl. ............................. 280/808; 24/115 L; 24/163 R; 24/197; 297/482
[58] Field of Search ............... 24/230 A, 73 R, 115 L, 24/115 K, 197, 163 R, 163 FC; 297/482, 468, 470, 486, 483, 484; 280/801, 808, 802, 804

[56] References Cited
U.S. PATENT DOCUMENTS 3,877,114  4/1975  Silen ............................ 24/163 R
4,052,772 10/1977  Telfson ........................ 24/163 FC
4,101,171  7/1978  Sasaki et al. .................. 297/483
4,199,190  4/1980  Lindblad ...................... 297/468

Primary Examiner—Richard A. Bertsch
Attorney, Agent, or Firm—Roger H. Criss; Robert H. Johnson

[57] ABSTRACT

A seat belt webbing guide (100) for directing seat belt webbing material (120) from a retractor to a shoulder belt (130) includes a one-piece cover and housing (10) in which a lightweight load bearing wire loop (60) is disposed in a substantially triangular shaped configuration. The bottom portion of the wire loop is maintained straight by a tubular element (75) and an idler roller (80) surrounding the tubular element (75) enables the webbing material to extend partially around the roller (80) through the loop opening with a low friction rolling engagement. The roller (80) is mounted in a recessed area (86) of the housing (10) between two upright end flanges (90) which laterally retain the webbing. The ends (62, 64) of the wire loop (60) opposite the roller (80) are introduced from opposite directions into a length of wall tubing (70) and arranged to overlap each other. When the tubing (70) is swedged, the tubing walls are deformed against the wire ends (62, 64) resulting in high frictional engagement between the ends (62, 64) and the tubing (70). The wall tubing (70) extends around a support collar (12) formed in the housing (10) for mounting on a load bearing area of the vehicle.

11 Claims, 2 Drawing Figures

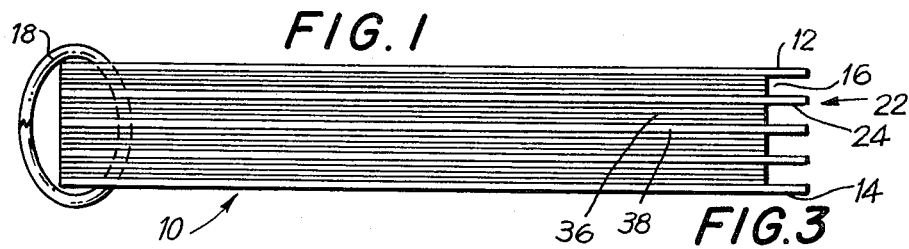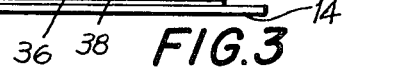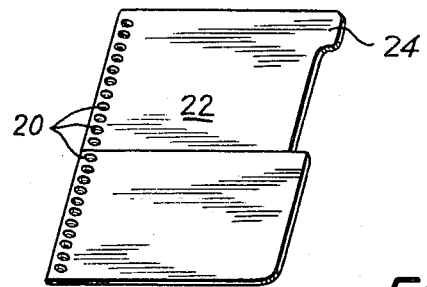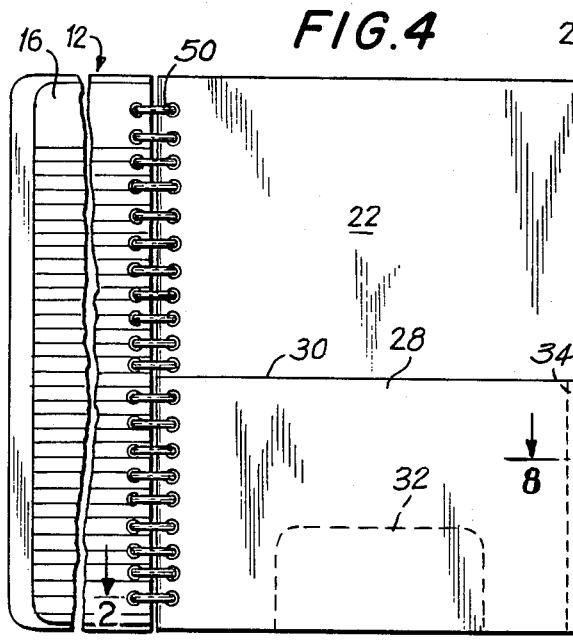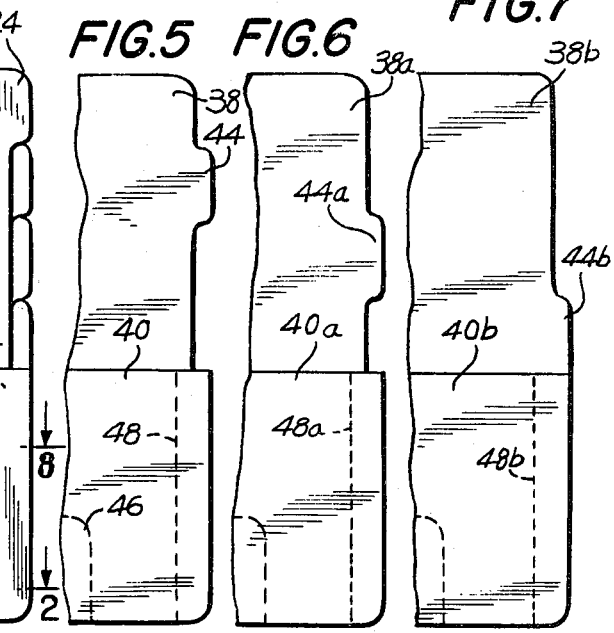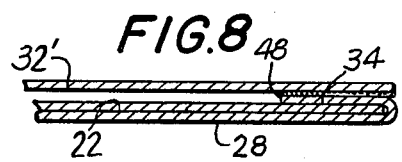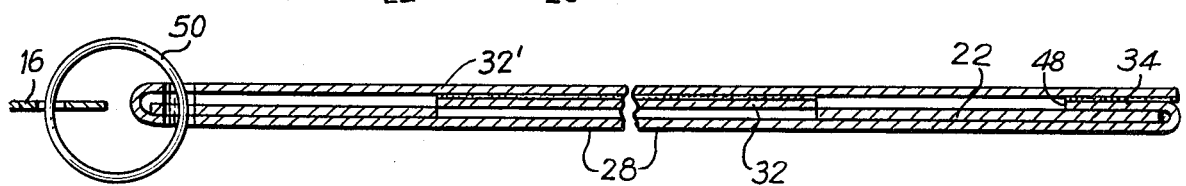

SEAT BELT WEBBING GUIDE

TECHNICAL FIELD

The present invention relates generally to load bearing seat belt webbing guides, and more particularly, to such seat belt guides providing minimum frictional resistance to belt movement and capable of withstanding impulsive loading during vehicle collision.

BACKGROUND ART

Load bearing seat belt web guides are known in the prior art for directing seat belt webbing material into shoulder belt retractors to restrain vehicle occupants during collisions. Because these devices must resist substantial occupant-induced loads, they must be constructed of high strength materials. In normal operation, web guides must also be capable of permitting seat belt webbing to pass through the guide with minimal retarding frictional force. Accordingly, these devices, which are usually fabricated of metal to provide the desired structural strength, are often provided with a plastic surface coating for reducing friction with the webbing.

Some attempts have been made to achieve a structure having necessary load bearing capacity while imparting minimal web retarding friction forces. In U.S. Pat. No. 4,052,772 to Tolfsen, for example, a pillar loop is formed of round or bar steel provided in a loop with the end portions extending toward each other and bent at 90° to be parallel to each other. The parallel ends are secured in a flattened steel tube having an aperture for attaching the pillar loop, which may include a plastic surface, to the vehicle structure. Heavy steel material used to achieve the necessary load bearing strength, however, is inconsistent with vehicle weight reduction objectives to meet fuel economy standards. Accordingly, it is desirable to fabricate load bearing webbing guides of light weight materials without sacrificing ability to withstand the high loads to which the guides are subjected under collision impact.

It is accordingly one object of the present invention to provide a load bearing seat belt webbing guide that is light weight to conform to fuel economy standards.

Another object of the invention is to provide a seat belt webbing guide that guides seat belt webbing material with minimal frictional retardation.

Yet, another object is to provide a seat belt webbing guide which can be manufactured at low cost and easily installed in a vehicle.

DISCLOSURE OF INVENTION

A load bearing seat belt webbing guide capable of guiding seat belt webbing material with minimal frictional engagement, in accordance with the invention, comprises load bearing flexible wire loop means having upper and lower loop portions shaped to define a loop opening sufficiently large to permit pass through of seat belt webbing. Guide means, such as a low friction tube element, retains the lower loop portion substantially straight for slideably supporting and guiding seat belt webbing passing through the loop means. The loop means, which preferably comprises a wire loop fabricated from a light weight material, is adapted to be secured to a load supporting area of the vehicle structure with a suitable fastening means. Roller means, such as a cylindrical roller, may surround the low friction tube element to provide a rolling support for the seat belt webbing to enable low friction pay out.

The webbing guide of the present invention may also be mounted within a housing portion of a cover and web guide housing structure. The loop means is disposed within the housing which includes a recessed area defined by two end flanges supporting the roller means. This structure produces low retarding friction during extraction and retraction of the seat belt webbing around the roller while the end flanges laterally retain the webbing. The upper loop portion extends around the fastening means to resist downward traction forces.

The wire loop means may also comprise a wire loop having terminal ends which are secured together in tight fitting frictional engagement with loop end securing means. Preferably, the loop end securing means comprises a heavy wall tubing swedged around the terminal ends of the cable which are introduced into the tubing from opposite directions and arranged to overlap each other so that the ends are frictionally secured to each other. The loop end securing means extends around supporting means, such as a support collar projecting outwardly from the housing, so that traction forces exerted upon the loop will increase frictional engagement between the ends. The support collar includes an axial bore for securing the web guide to a load bearing area of the vehicle with a nut, bolt and washer assembly. The washer has a diameter greater than the collar diameter and is positioned between the bolt head and support collar to define a channel in which the swedged tube is disposed to prevent the loop from slipping off the collar.

Additional objects, advantages and novel features of the invention will be set forth in part in the description which follows and in part will become apparent to those skilled in the art upon examination of the following or may be learned by practice of the invention. The objects and advantages of the invention may realized and attained by means of the instrumentalities and combinations particularly pointed out in the appended claims.

BRIEF DESCRIPTION OF DRAWINGS

FIG. 1 is a detailed cross-sectional end view of a seat belt webbing guide in accordance with the invention; and FIG. 2 is a front detailed sectional view taken along the line 2—2 of FIG. 1, illustrating the positioning of the components of the seat belt webbing guide of the present invention.

BEST MODE FOR CARRYING OUT THE INVENTION

Referring to FIGS. 1 and 2, a seat belt webbing guide 100 includes a one-piece housing structure 10 for housing guide components. Housing structure 10 is non-load bearing, and is therefore preferably fabricated of a plastic or other suitable light weight material shaped in a triangular configuration having sides large enough to receive a flexible wire cable loop means. Preferably, such loop means comprises a wire cable loop 60 which is fabricated from a light weight, flexible material, such as stranded steel cable, and includes terminal ends 62, 64 (FIG. 2). The loop 60 may also be fabricated from stranded wire covered with a plastic coating.

Referring to FIG. 2, guide means is provided for retaining the lower portion of loop 60 straight to direct seat belt webbing 120 from a retractor (not shown) to extend across the chest and shoulder of an occupant as illustrated by belt 130. Preferably, such guide means includes a tube element 75, through which the wire loop 60 is threaded. Tube 75, surrounding the lower portion of wire 60, is mounted within housing 10 in recessed area 86 between upright and flanges 90. The tube 75 extends through openings formed in end flanges 90 and may be bonded or otherwise secured to the end flanges in the position shown. Roller means, such as a plastic idler roller 80, may also surround tube 75 between the end flanges 90. Extraction of retraction of seat belt webbing 120 across roller 80 is very smooth and easy since there is very little retarding friction caused by the roller compared to direct sliding contact or prior art structures. Reinforcement gussets 91 may also be formed in housing 10 to provide additional support to recessed area 86 of the housing to resist forces occurring during normal extraction and retraction of seat belt webbing.

For the purpose of securing terminal ends 62, 64 of wire loop 60 together to form a loop, loop end securing means is provided which preferably comprises heavy wall tubing 70. Ends 62, 64 of wire loop 60 are introduced into the tubing 70 from opposite directions and arranged to overlap each other. By swedging tubing 70 into a C-shaped configuration, the tubing walls are deformed against the wire ends such that the ends are rigidly connected to each other and to the tube by friction, as shown in FIG. 1.

With the ends of wire loop 60 secured to form the upper portion of the loop, fastening means are provided which secure webbing guide 100 to a load bearing area of the vehicle structure (FIG. 1), such as a B-pillar, in the following manner. Preferably, the upper portion of the loop containing tubing 70 extends around a supporting means which projects outwardly from the housing 10. As shown in FIG. 1, the supporting means may comprise support collar 12 formed in the housing 10. The support collar 12 has an axial bore extending through the housing 10 in which fastening means are disposed. Such fastening means preferably includes a nut 30, bolt 40 and washer 50. The support collar 12 receives bolt 40, as shown in FIG. 1, which passes through the housing 10 and vehicle structure 20 and is secured by nut 30. Washer 50, which has an outer diameter greater than the corresponding diameter of the support collar 12, is spaced apart from housing 10 to form a channel for receiving the upper portion of wire cable loop 60. The washer 50 thus retains the tubing 70 around the support collar 12 and prevents slipping of the collar when subjected to downward pulling traction forces. It will also be understood, of course, that a spacer may be substituted for the support collar.

The full advantage of this invention may best be realized by following the operations of the seat belt webbing guide during normal conditions and under collision loading. During normal conditions, webbing 120 from the retractor passes over the roller 80 to form the shoulder belt 130. When the occupant desires to withdraw the proper length of belt from the retractor, belt 130 is drawn across roller 80 with minimal frictional retardation until the necessary length of belt is paid out. When it is desired to retract the seat belt webbing 120, a similar rolling movement of webbing material across roller 80 occurs without causing any bunching of webbing material between the roller and the recessed portion 86. Tube 75 maintains the lower portion of wire 60 in its desired shape.

During collision, downward pulling traction forces, induced by the sudden forward movement of the occupant, are transmitted to wire loop 60 through the seat belt webbing material extending around roller 80. Depending upon the magnitude of the tractional forces, roller 80 may break away from non-load bearing housing structure 10 but will still retain the seat belt webbing by the loop 60 passing through the roller 80. As the downward pulling traction forces are transmitted through wire loop 60 to tubing 70, the tubing will tend to tighten around support collar 12 and the fastening means. This tightening will further increase frictional contact between terminal ends 62, 64 and tubing 70, transmitting the traction forces to the vehicle structure through the fastening means, and restraining forward movement of the occupant under collision loading.

The foregoing description of a preferred embodiment of the present invention has been presented for purposes of illustration and description. It is not intended to be exhaustive or to limit the invention to the precise form disclosed, and obviously, many modifications and variations are possible, in light of the above teachings. The embodiment was chosen and described in order to best explain the principles of the invention and its practical application to thereby enable others skilled in the art to best utilize the invention in various embodiments and and with various modifications as are suited to the particular use contemplated. It is intended that the scope of the invention be defined by the claims appended hereto.

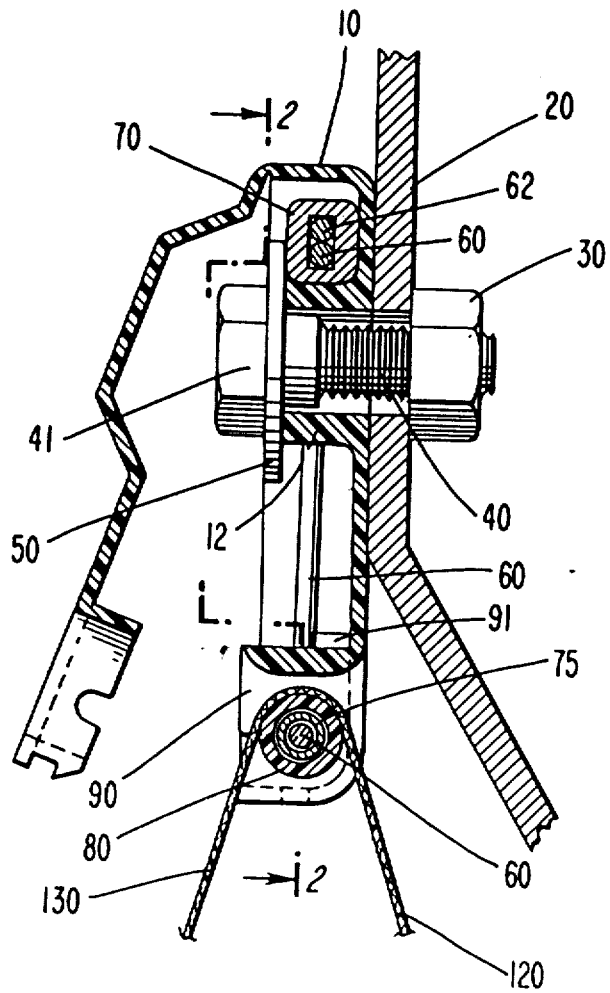

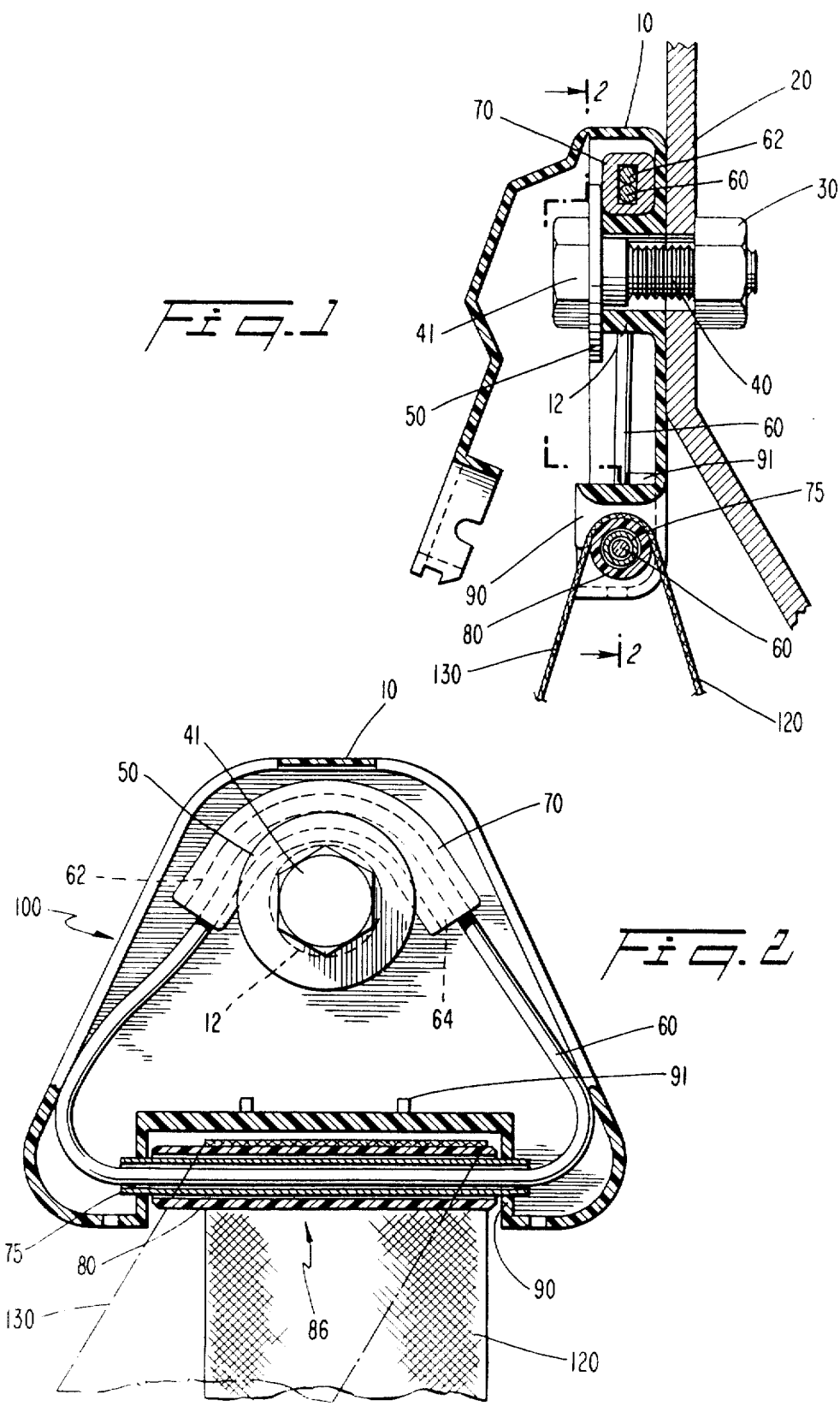

I claim:
1. A seat belt web guide, comprising:
 (a) load bearing flexible wire loop means having upper and lower loop portions wherein said loop means is shaped to define a loop opening large enough to receive seat belt webbing, wherein said loop means is adapted to be secured to a load supporting area of the vehicle structure;
 (b) guide means for maintaining only the lower portion of said flexible wire loop means substantially straight for supporting and guiding said seat belt webbing passing through the loop means, said guide means comprising a tube element surrounding said lower loop portion for supporting seat belt webbing passing partially around the guide means and through the loop means;
 (c) fastening means adapted to be secured to a vehicle structure for securing said loop means to the vehicle structure, said upper loop portion extending around said fastening means;
 (d) a housing structure containing said loop means, including a recessed portion defined by two end flanges, said flanges being formed with apertures for mounting said tube element therebetween; and
 (e) roller means surrounding said tube element for rollably supporting said seat belt webbing.

2. The device according to claim 1 wherein said flexible wire loop means includes overlapping terminal ends.

3. The device according to claim 2 further comprising loop end securing means for rigidly securing the overlapping ends of said loop means to each other in tight fitting engagement, said end securing means defining the upper portion of said loop means.

4. The device according to claim 3, wherein said loop ends securing means comprises a heavy wall tubing swedged around said terminal ends introduced into said tubing from opposite directions and arranged to overlap each other so that the ends are frictionally secured to each other whereby traction forces exerted upon said loop means tend to increase frictional engagement between said terminal ends.

5. The device according to claim 1, wherein said load bearing wire loop means comprises a wire loop.

6. The device according to claim 5, wherein said wire loop comprises a stranded wire cable coated with a plastic material to minimize friction.

7. The device according to claim 5, wherein said wire loop is fabricated from stranded steel cable.

8. A load bearing shoulder seat belt web guide for supporting belt webbing at shoulder height to a load supporting member within a vehicle to resist impulsive forces developed during collisions and prevent sudden concomitant forward movement of a restrained occupant, comprising (a) housing structure, load supporting wire loop means having terminal ends, said loop means positioned within said housing structure in substantially triangular shaped configuration, wherein the upper portion of said loop means includes a heavy wall tubing swedged around said terminal ends introduced into the tubing from opposite directions and arranged to overlap each other so that the ends are frictionally secured to each other and to the tube, said swedged tube extending around supporting means projecting outwardly from the housing, fastening means engaging said supporting means and adapted to secure the housing and said loop means to the vehicle structure; said housing further comprising a recessed portion below said supporting means defined by two end flanges, roller means surrounding the lower portion of loop means and rotatably mounted to said flanges, said roller means rollably engaging said belt webbing.

9. The device according to claim 8, wherein said fastening means comprises a support collar and a nut, bolt and washer assembly, wherein the outer diameter of said washer is greater than the diameter of said support collar, said washer being positioned against an exposed face of said collar to define a channel between said washer and housing for retaining said upper loop portion therein under traction force loading.

10. The device according to claim 8, wherein said supporting means includes a support collar having an axial bore formed in said housing.

11. The device according to claim 1 or 9, wherein said roller means comprises an idle roller fabricated from a plastic material.

* * * * *

UNITED STATES PATENT AND TRADEMARK OFFICE
CERTIFICATE OF CORRECTION

PATENT NO. : 4,389,059

DATED : June 21, 1983

INVENTOR(S) : Robert L. Stephenson

Page 1 of 3

It is certified that error appears in the above-identified patent and that said Letters Patent is hereby corrected as shown below:

The title page should be deleted to appear as per attached title page.

The sheets of drawings should be deleted to appear as per attached sheets.

Signed and Sealed this

Twenty-fifth Day of October 1983

[SEAL]

Attest:

Attesting Officer

GERALD J. MOSSINGHOFF

Commissioner of Patents and Trademarks

United States Patent [19]

Stephenson

[11] 4,389,059
[45] Jun. 21, 1983

[54] SEAT BELT WEBBING GUIDE

[75] Inventor: Robert L. Stephenson, Utica, Mich.

[73] Assignee: Allied Corporation, Morris Township, Morris County, N.J.

[21] Appl. No.: 205,225

[22] Filed: Nov. 10, 1980

[51] Int. Cl.³ .................. A44B 11/00; A62B 35/00; B60R 21/10
[52] U.S. Cl. .................. 280/808; 24/115 L; 24/163 R; 24/197; 297/482
[58] Field of Search ............. 24/230 A, 73 R, 115 L, 24/115 K, 197, 163 R, 163 FC; 297/482, 468, 470, 486, 483, 484; 280/801, 808, 802, 804

[56] References Cited

U.S. PATENT DOCUMENTS

| 3,877,114 | 4/1975 | Silen | 24/163 R |
| 4,052,772 | 10/1977 | Telfson | 24/163 FC |
| 4,101,171 | 7/1978 | Sasaki et al. | 297/483 |
| 4,199,190 | 4/1980 | Lindblad | 297/468 |

Primary Examiner—Richard A. Bertsch
Attorney, Agent, or Firm—Roger H. Criss; Robert H. Johnson

[57] ABSTRACT

A seat belt webbing guide (100) for directing seat belt webbing material (120) from a retractor to a shoulder belt (130) includes a one-piece cover and housing (10) in which a lightweight load bearing wire loop (60) is disposed in a substantially triangular shaped configuration. The bottom portion of the wire loop is maintained straight by a tubular element (75) and an idler roller (80) surrounding the tubular element (75) enables the webbing material to extend partially around the roller (80) through the loop opening with a low friction rolling engagement. The roller (80) is mounted in a recessed area (86) of the housing (10) between two upright end flanges (90) which laterally retain the webbing. The ends (62, 64) of the wire loop (60) opposite the roller (80) are introduced from opposite directions into a length of wall tubing (70) and arranged to overlap each other. When the tubing (70) is swedged, the tubing walls are deformed against the wire ends (62, 64) resulting in high frictional engagement between the ends (62, 64) and the tubing (70). The wall tubing (70) extends around a support collar (12) formed in the housing (10) for mounting on a load bearing area of the vehicle.

11 Claims, 2 Drawing Figures